Jan. 18, 1938. W. E. GLOOR 2,105,768
BOTTLE CAP
Filed Aug. 3, 1934

INVENTOR
Walter E. Gloor
BY
ATTORNEY

UNITED STATES PATENT OFFICE

2,105,768

BOTTLE CAP

Walter E. Gloor, Wilmington, Del., assignor to Hercules Powder Company, Wilmington, Del., a corporation of Delaware Application August 3, 1934, Serial No. 738,292

3 Claims. (Cl. 215—39)

This invention relates to an improvement in bottle caps and more particularly to a bottle cap of a type provided with a cork insert or cushion carrying a spot of metal foil.

More specifically this invention relates to bottle caps in which the metal foil spot, an inorganic material, is adhered to the cork insert or cushion, an organic material, through the medium of a particular type of thermoplastic cement.

Heretofore in the formation of bottle caps it has been known, to adhere metal foil to the cork cushions, with use of an adhesive gutta percha composition. Again, it has been known to use a cellulose ester thermoplastic composition as, for example, a nitrocellulose-synthetic resin composition.

The adhesive compositions heretofore used have, however, not proved satisfactory for various reasons. Thus, for example, gutta percha compositions lose their bonding power in a short time and are relatively costly. Cellulose ester compositions are not resistant to the penetrating polar vapors, as carbon dioxide, commonly found in carbonated beverages, with the result that they break down and lose their bonding power. Cellulose ester compositions which are heated for application are further unsatisfactory due to the fact that cellulose compounds, and especially the nitrate, are inherently unstable to heat.

Now, in accordance with this invention, a bottle cap is formed with use of an adhesive which gives a permanent tenacious bond between the metal foil and cork, which is stable to heat and the penetrating action of polar gases, as carbon dioxide, and which will not impart any objectionable taste to the contents of the bottle.

Having now indicated in a general way the nature and purpose of my invention, I will proceed to a more detailed description thereof by reference to the accompanying drawing, in which.

Figure 1:
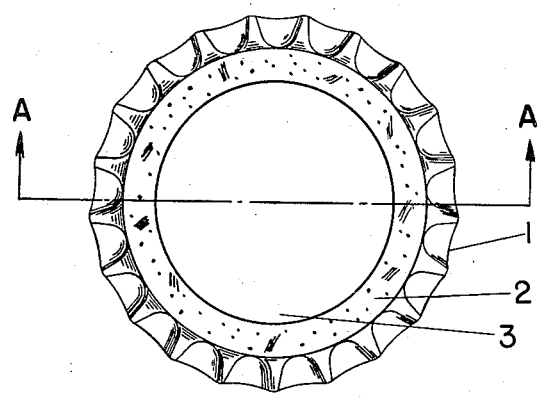
Figure 1 is a plan view of the interior of my improved cap.
Figure 2:
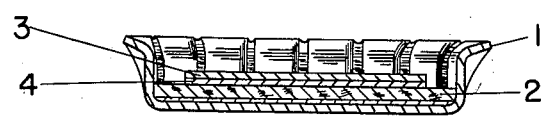
Figure 2 is a cross sectional view along the line A—A of Figure 1.
Figure 3:
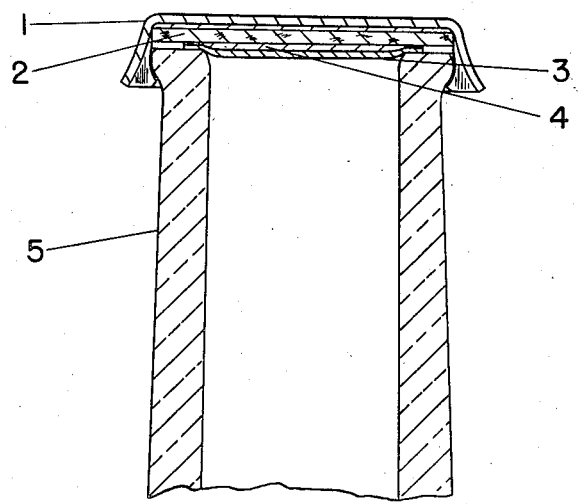
Figure 3 is a cross section of my improved cap when fitted over the mouth of a bottle.

The bottle cap in accordance with this invention comprises the usual metallic body 1, a cork cushion disc 2, and a metal foil spot 3. The metal foil spot 3 is adhered to the cork cushion disc 2, by means of a thermoplastic composition 4, including a chlorinated rubber, with which resin may be included. Desirably, though not necessarily, a plasticizer will be included in the composition.

The chlorinated rubber ingredient of the adhesive may be produced in any manner well known to the art and may contain chlorine in desired amount, say, for example, within the range about 50% to about 70% chlorine. The resin may be of any desired well known type, either natural or synthetic, as, for example, rosin, cumar resin, ester gum, etc. Likewise the plasticizer may be of any well known type, as, for example, linseed oil, dibutyl phthalate, hydrogenated methyl abietate, etc.

The ingredients of the composition may be used in any desired proportions. Generally speaking, when a resin is used it will be present in amount in excess of the amount of chlorinated rubber; while a plasticizer when included will be present in relatively small amount. As illustrative, for example, the inclusion of a resin in amount from about 40% to about 70%, by weight, will be advantageous. A plasticizer may be advantageously included in amount from about 5% to about 30%.

For initial application of the adhesive composition, it will be dissolved in any suitable organic solvent, as, for example, xylol, toluol, ethylene dichloride, etc., which will be used in amount to give a solution of desired workable consistency or viscosity.

As more specifically illustrative, for example, satisfactory adhesive compositions may be made up on the following formulae:

| Solution designation | 1 | 2 | 3 | 4 | 5 | 6 | 7 |
|---|---|---|---|---|---|---|---|
| Chlorinated rubber—(Tornesit) | 17 | 15 | 15 | 12.5 | 12.5 | 12.5 | 12.5 |
| Rosin—FF wood | 25 | 30 | 30 | | | | |
| Ester gum—pale | | | | 25 | 25 | 25 | |
| Cumar resin—soft type | | | | | | | 30 |
| Linseed oil | | 4 | | | | | |
| Dibutyl phthalate | | | 4 | | | | |
| Hydrogenated methyl abietate | | | | | | 3 | |
| Xylol | 58 | 51 | 51 | 62.5 | 59.5 | 59.5 | 57.5 |

In making up bottle caps in accordance with this invention, metal foil, as aluminum foil, is coated, on, for example, a roller coating machine, with, for example, a composition according to any one of the above formulae and the solvent eliminated, for example, by passing the coated foil through a drying tunnel.

The foil spots are then cut or stamped out of the coated foil and applied to the previously formed cork cushions by usual methods, as, for example, by first hot pressing the spot to the cork to give initial adhesion and finally cold pressing to give final adhesion, the adhesion being effected, of course, through the medium of the layers of thermoplastic adhesive compositions sandwiched between the foil spot and the cork cushion.

As will be understood the adhesive composition described and illustrated herein will be adaptable for adhering organic materials, other than cork and metal foil, generally and hence provides an efficient and desirable adhesive for use variously, in the arts and one which may be used in the application of any usual methods.

What I claim and desire to protect by Letters Patent is:

1. A bottle cap including a metal body, a cork cushion, a metal foil spot and a layer of thermoplastic adhesive composition positioned between the cushion and the spot and adhering the spot to the cushion, said adhesive composition consisting of chlorinated rubber in amount of from about 29.5% to about 40.5% by weight of the composition and a synthetic resin in amount of from about 59.5% to about 70.5% by weight of the composition, the said cap being permanently resistant to penetration by a polar gas when used as a closure for a bottle.

2. A bottle cap including a metal body, a cork cushion, a metal foil spot and a layer of thermoplastic adhesive composition positioned between the cushion and the spot and adhering the spot to the cushion, said adhesive composition consisting of about 31% by weight of chlorinated rubber, 62% by weight of a resin, and 7% by weight of a plasticizer, the said cap being permanently resistant to penetration by a polar gas when used as a closure for a bottle.

3. A bottle cap including a metal body, a cork cushion, a metal foil spot and a layer of thermoplastic adhesive composition positioned between the cushion and the spot and adhering the spot to the cushion, said adhesive composition consisting of chlorinated rubber in amount of from about 29.5% to about 40.5% by weight of the composition, a resin and a plasticizer.

WALTER E. GLOOR.